(12) United States Patent
Essaian

(10) Patent No.: US 7,413,635 B2
(45) Date of Patent: Aug. 19, 2008

(54) METHOD FOR THE FABRICATION OF PERIODICALLY POLED LITHIUM NIOBATE AND LITHIUM TANTALATE NONLINEAR OPTICAL COMPONENTS

(75) Inventor: Stepan Essaian, San Jose, CA (US)

(73) Assignee: Spectralus, Inc., San Jose, CA (US)

( * ) Notice: Subject to any disclaimer, the term of this patent is extended or adjusted under 35 U.S.C. 154(b) by 913 days.

(21) Appl. No.: 10/741,624

(22) Filed: Dec. 19, 2003

(65) Prior Publication Data

US 2005/0133477 A1 Jun. 23, 2005

(51) Int. Cl.
*B01J 19/08* (2006.01)

(52) U.S. Cl. .................. 204/164; 427/466; 359/326; 372/22

(58) Field of Classification Search .............. 204/164; 427/466; 359/326; 372/22
See application file for complete search history.

(56) References Cited

U.S. PATENT DOCUMENTS

| | | | | |
|---|---|---|---|---|
| 5,568,308 A | * | 10/1996 | Harada | 359/326 |
| 6,211,999 B1 | * | 4/2001 | Gopalan et al. | 359/326 |
| 2007/0153850 A1 | * | 7/2007 | Scripsick et al. | 372/39 |

* cited by examiner

*Primary Examiner*—Kishor Mayekar
(74) *Attorney, Agent, or Firm*—Dickinson Wright PLLC

(57) ABSTRACT

A process for reducing the poling field of congruent $LiNbO_3$ and $LiTaO_3$ crystal-based nonlinear optical devices and for the production of domain structures with precise reproducibility of the main parameters by depositing a thin layer of a stoichiometric $LiNbO_3$ film on the Z-face of a congruent $LiNbO_3$ or $LiTaO_3$ wafer. A new domain nucleation, evolution and stabilization process is provided to afford a uniform, short period domain superstructure for the conversion of near infrared light to near ultraviolet, blue and green light.

20 Claims, 6 Drawing Sheets

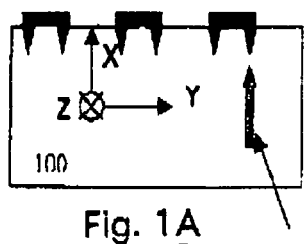
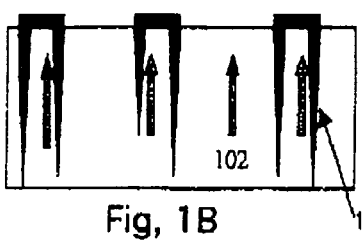
Fig. 1A  Fig. 1B  Fig. 1C
Spontaneous Polarization  Electrodes
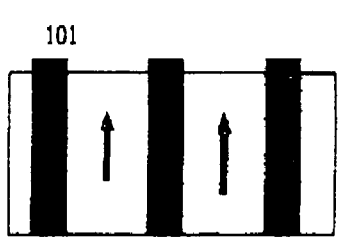
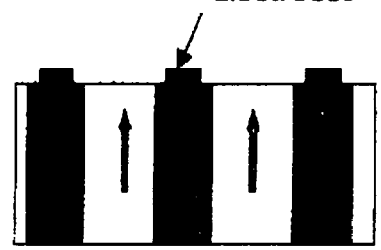
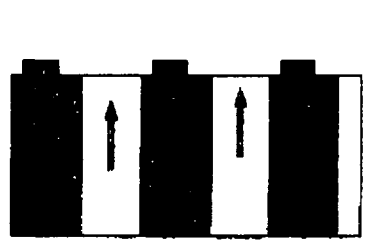
Fig. 1D  Fig. 1E  Fig. 1F

METHOD FOR THE FABRICATION OF PERIODICALLY POLED LITHIUM NIOBATE AND LITHIUM TANTALATE NONLINEAR OPTICAL COMPONENTS

FIELD OF THE INVENTION

This invention relates to an improved process for the fabrication of $LiNO_3$ and $LiTaO_3$ optical devices

BACKGROUND OF THE INVENTION

Since the invention of the first laser many years ago, the frequency conversion off laser radiation by nonlinear optical crystals has become an important technique widely used in quantum electronics and laser physics for solving various scientific and engineering problems. The fundamental physics of three-wave light interactions in nonlinear optical crystals is now reasonably well understood. This has enabled the production of various harmonic generators, sum- and difference-frequency generators, and optical parametric oscillators based on the nonlinear optical crystals that are now commercially available. At the same time, scientists continue an active search for improved nonlinear optical materials. The present invention relates to a method for the fabrication of a bulk periodically poled domain (PPD) structure-in congruently grown lithium niobate (LN), Lithium Tantalate (LT) and Magnesium Oxide doped LN and LT (MgO:LN and MgO:LN). These structures comprise nonlinear optical materials which are suitable for use in optical devices to convert near infrared (NIR) radiation from a diode or other laser to light in the blue-green (visible) or near UV region of the optical spectrum. In particular this invention relates to an efficient process for the fabrication of poled Lithum Niobate and Lithum Tantalate crystals for the generation of blue-green and UV light using quasi phase matching (QPM). These materials are ferroelectric, which means that below their Curie temperature they exhibit a spontaneous electric polarization even if no external electric field is applied. Periodic inversion of the spontaneous polarization is called "poling" and provides a means for producing the 180° phase shift required to implement QPM. Further information on the applications and properties of nonlinear crystals, especially LN and MgO doped LN, are given in "Handbook of Nonlinear Optical Crystals" by V. G Dmitriev, G. G Gurzadyan and D. N. Nikogosyan Springer-Verlag (1999) ISBN3-540-69354-5292.

Laser light in the blue-green (visible) wavelength (i.e., 400-550 nm) wavelength region is used in a wide variety of analytical techniques. Currently the only generally available source of coherent blue-green light is the Argon ion laser. Argon ion lasers are relatively bulky, delicate and expensive. There is a great need for a solid state blue-green laser. None is currently available which emits in this spectral region. However there are solid state (semiconductor diode) lasers which emit in the near infra-red (NIR) region.

Frequency doubling (nonlinear frequency conversion) would enable a NIR laser to provide blue-green light. An extensive discussion of blue-green laser technology and applications, including biomedical engineering, spectroscopy, semiconductor wafer inspection, display science, optical data storage, reprographic, color display and undersea communication is contained in "Blue-Green Lasers" by W. Risk, T. Gosnell and A. Nurmikko, Cambridge University Press (2003) ISBN 0-521-52103-3. The discussion of nonlinear frequency conversion using quasi phase matching in non-linear crystals contained therein is incorporated herein by this reference (see especially pages 77-84 and 101-104 and 108).

Conversion of NIR laser source light into light in the green-blue spectral range can be carried out by using second harmonic generation (SHG), also known as frequency doubling techniques, a technology generally known in the laser-based optical industry. A reasonable goal for single-pass conversion efficiency is that it should be in ~25% range to avoid excessive laser cost. Conversion efficiency is proportional to input power, the square of the effective nonlinear coefficient of the nonlinear element (crystal) and the length of the nonlinear element As crystal length is increased, conversion efficiency increases, but the frequency doubling process becomes more sensitive to changes in temperature, strain and other factors affecting the uniformity of the refractive index of the nonlinear element. As a result, length alone cannot be used to compensate for an element's low nonlinearity.

A technique that compensates for the difference in phase velocity between the fundamental wave and its harmonic in a nonlinear crystal caused by natural dispersion is known as birefringent phase matching. In this case, the optical anisotropy of a nonlinear crystal is used to find a unique propagation direction where fundamental and harmonic waves have the same phase velocity. For most of the commercially available nonlinear optical materials (LN, LT, and KTP) the maximum conversion efficiency is about 1.25%. LN and LT are particularly attractive materials because of their status as commodity materials, and as follows from Table 1 they have a high nonlinear coefficient (normally referred to as $d_{33}$) and also are available in relatively large size crystals.

Quasi-phase matching (QPM) provides the mechanism for an efficient way to generate second harmonic frequencies. The general concept of using QPM as a mechanism for doubling optical frequencies has been known for about forty years. Essentially it is a technique that compensates for the difference in phase velocity between the fundamental wave and its harmonic in a nonlinear crystal caused by natural dispersion. In QPM, the two waves are allowed to have different phase velocities, and they shift out of phase relative to one another over a distance called the coherence length At present the most efficient way to create a QPM structure is to use periodically poled crystalline ferroelectric materials. In these materials, creating specific micrometer scale domain configurations with a periodically alternating direction of spontaneous polarization, are used for this purpose. Due to the polar character of these materials the sign of the non-linear coefficient ($d_{33}$) can be changed by switching the direction of spontaneous polarization. If the period ($\Lambda$) of the periodically polled domain structure is equal to double the coherent length, the phase difference due to natural dispersion is compensated for by the change of the sign of the non-linear coefficient ($d_{33} \Rightarrow -d_{33}$) at the domain boundaries, causing the continuous transference of power from the fundamental beam to the harmonic beam throughout the entire length of the crystal.

The efficiency of a conversion is a strong function of both the non-linear coefficient and the length of the crystal Therefore, to enhance the efficiency of conversion the material with the maximum non-linear coefficient should be used, and the interaction region should also be as long as possible.

Effective nonlinear coefficient value, poling period and absorption edge (the range of limited absorption) are the factors which influence the choice of periodically poled materials for SHG applications.

There are only a few ferroelectric materials with nonlinear coefficients greater than 10 pm/V (as shown in Tab. 1). While dispersion prevents direct access to the full value of $d_{33}$, QPM can provide up to $(2/\pi) \times 100\% = 64\%$ of the full nonlinearity, making each of the materials shown in Table 1 a prima facie candidate for efficient doubling of the frequency of semiconductor lasers.

TABLE 1

Parameters of perspective ferroelectrics for QPM-SHG applications

| Crystal | $d_{33}$ pm/V | Curie Temperature °C. | Coercive Field, Ec KV/mm | Growth method and max. crystal size |
|---|---|---|---|---|
| LiNbO$_3$ (LN) | 40 ± 5 | ~1160 | ≦2* 20-25** | CZ 100Φ × 60 mm |
| LiTaO$_3$ (LT) | 20 ± 2 | 610 | ≦2* 18-25** | CZ 100Φ × 50 mm |
| KNbO$_3$ (KN) | 25 ± 5 | 225 | ≦0.6 | CZ 15Φ × 20 mm |
| KTiOPO$_4$ (KTP) | 15 ± 2 | ~670 | 2.6 | CZ 20Φ × 25 mm |

*For stoichiometric LN and LT
**For congruent LN and LT

Table 1 shows that most effective material for SHG application i.e., the material which has the biggest value of $d_{33}$ is a LN crystal. Due to QPM, it is possible to create viable bulk single-pass blue-green light sources using LN, since it provides a way to obtain a normalized room temperature conversion efficiency of 2.6-3% /(watt•cm) for 1064 nm⇒532 nm SHG and 5.2%/(watt•cm) efficiency for 852 nm⇒426 nm SHG. LT has a normalized room temperature conversion efficiency of 0.85-1%/(watt•cm) for bulk single-pass 1064 nm⇒532 nm SHG. For 852 nm⇒426 nm SHG, LT has a normalized conversion efficiency of 2%/(watt•cm). It should be noted that for wavelengths of ≦410 nm LT has higher transparency compared to LN and therefore it may be the material of choice for 300 nm-410 nm wavelength (near UV) conversion. Two materials in which QPM has been demonstrated for blue green (BG) light generation are KN and KTP. The normalized conversion efficiency for these materials is ~2.5%/(watt•cm) for KN and 1.5%/(watt•cm) for the 852 nm⇒426 nm SHG. To achieve 25% single-pass conversion efficiency, a KN crystalline element of 2.5 cm and a KTP crystalline element of 3.5 cm length is required. However the maximum crystal length currently available is 2 cm for KN and 3 cm for KTP. Therefore, KN and KTP are currently not viable choices because both crystals are not commercially available in sufficiently long sizes, are very expensive, and also suffer from a number of quality issues. Lithium niobate (LiNbO$_3$), often referred to as "the silicon of nonlinear optics," is an excellent material for SHG for two reasons. First, LiNbO$_3$ is already produced at a volume of 40 tons per year for consumer applications (cellular phones and televisions) using a very stable fabrication technology. Second, LiNbO$_3$ is transparent from 350 nm to 5000 nm, providing low loss for both the fundamental and harmonic for visible light generation. Finally, LiNbO$_3$ has nonlinear coefficients for visible light generation among the highest of all inorganic materials.

While LiNbO3 is an attractive material because of its status as a commodity material, the only component of its nonlinear tensor large enough to satisfy the requirements of display applications is $d_{33}$, having a value of 25.2 pm/volt. While dispersion prevents direct access to the full $d_{33}$ coefficient, quasi-phase-matching (QPM) can provide up to 64% of the full nonlinearity, or 16 pm/volt, making LiNbO$_3$ a very strong candidate for display applications that use QPM.

Essentially QPM is a technique that compensates for the difference in phase velocity between the fundamental wave and its harmonic in a nonlinear crystal caused by natural dispersion. In QPM, two waves having different phase velocities shift [pi] out of phase relative to one another over a distance called the coherence length. The sign of the nonlinear coefficient reverses every coherence length, causing the locally generated harmonic field to transfer power to the harmonic beam. By compensating for phase-velocity mismatch in this way, all elements of a crystal's nonlinear tensor can be accessed throughout the entire transparency range Three other potential materials in which QPM has been demonstrated for visible light generation are LiTaO$_3$ and MgO doped LN and LT. LiTaO$_3$ has a normalized room temperature conversion efficiency of 0.83%/(watt-cm), below that required for bulk single-pass 1064 nm SHG. However, for 852 nm SHG, LiTaO$_3$ has a normalized conversion efficiency of 1.8%/(watt-cm) and is therefore a strong candidate for that application.

OBJECTS OF THE INVENTION

The current art is unable to provide a number of features required for the manufacture of inexpensive visible light sources based on quasi-phased matched second harmonic generation, using bulk periodically poled material for nonlinear optical interactions. These problems include poor reproducibility from sample to sample, shallow inverted domains unsuitable for bulk optical interactions, and the destructive effects of electrical breakdown on the crystal substrate Electric field poling is difficult since the electric field strength required for poling is close to the threshold for electric breakdown. In order to achieve poling, the applied field must be above that required for poling, but not significantly above the breakdown field. In practice, this precise control has proved very difficult to achieve, and the difficulty becomes more severe with larger samples where the breakdown field strength can vary across the sample An objective of the present invention is to provide a new and improved manufacturing method for producing periodically poled domain (PPD) structures suitable for the conversion of NIR laser radiation to light in the UV to blue-green range of the optical spectrum by using a novel low electric field poling process in congruent LN and LT crystals. When used herein and in the appended claims, Lithium Niobate is intended to include MgO doped Lithium Niobate and likewise Lithium Tantalate is intended to include MgO doped Lithium Tantalate. It is a further objective of this invention to provide optimized poling parameters including surface treatment, temperature, electrode parameters and poling waveform.

BRIEF DESCRIPTION OF THE INVENTION

In the practice of my invention generally known lithographic techniques can be used to produce QPM structures and to assure periodicity, which is important since even small errors in periodicity can substantially degrade conversion efficiency. The fabrication of the masks used in lithography employs interferometric feedback control, which reduces the positional error of any feature over the dimension of the mask to less than a quarter of the wavelength of a He—Ne laser, or ±0.15 micron, resulting in a negligible reduction in conversion efficiency for a ≧3 μm-period grating. The ability to define a periodically poled domain (PPD) structure with lithographic precision creates an opportunity in nonlinear optics to fabricate SHG-based conversion devices with a performance not achievable using non-lithographic fabrication techniques.

In accordance with the present invention, a QPM structure is fabricated in LN and LT crystals by creating a ferroelectric domain-inverted grating. Although several methods have been demonstrated for producing a domain-inverted structure with a period of a few micrometers in a nonlinear material. At present, the most widely used technique involves the definition of a periodic electrode on one major surface of a crystal. This periodic electrode can be a patterned metal film, or a photoresist layer overlaid with a deposited metal film or a liquid electrolyte. A uniform electrode is applied to the opposite crystal major surface. When a sufficiently large electric field is applied between these two electrodes, inverted domains begin to nucleate under the regions where the periodic electrode is in contact with the crystal. Under the influence of the applied field, these domains grow until they fill the area directly under the electrode and extend across the entire thickness of the crystal Electric field. Poling is used to create the domain grating. Fabrication of LN and LT QPM devices involves first lithographically patterning the domain grating structure Then the domain-inversion is achieved by applying a pulsed voltage to lithographically define periodic electrodes so that the Z-component (Z being the polar axis of LN and LT) of an induced electrical field is larger than the coercive field of LN and LT (as shown in Table 1). This technique is referred to as electric field periodic poling.

Domain periods (A) between 6 µm and 8 µm are required for green light generation, while near UV and blue light generation requires domain periods between 2.5 µm and 5 µm. To reach a high efficiency of conversion, engineering of a uniform domain grating with a duty cycle (the ratio between the distance of the outward domain wall from the electrode center and half the grating period) close to 50% in 0.5 to 3.5 mm, preferably 1 mm-2 mm thick LN and LT crystalline elements are required. To develop correct poling procedures it is important to understand the dynamics of the domain structure in LN and LT crystals, and its connection with crystalline structure and polling parameters. The physics of domain formation in LN and LT ferroelecric crystals is complicated. Domain structure and kinetics during electrical field periodic poling are closely correlated with crystalline structure and polling parameters. Crystalline defects play a major role: It is easer create a uniform domain grating in stoichiometric LN, LT (SLN, and SLT) which have minimal defects in comparison with congruent LN and LT (CLN, CLT). However, the growth process for SLN or SLT is slow and complicated, a stress free bule has a maximum diameter of only about 50 mm., and there are no data on uniformity of optical parameters for wafers fabricated therefrom. Commercial production of SLN or SLT wafers is not a reality.

Therefore, I have directed special efforts toward identifying and optimizing poling parameters suitable for providing repeatable, good-quality periodic domain patterns in CLN and CLT crystals, which are commercially available. The domain kinetics during electric field periodic poling of LN and LT ferroelectric materials can be described in six stages as shown in FIG. 1.

A crystalline wafer 100 is in the single domain state with the up directed polarization (as indicated by the arrows which show the polarization direction within domains). A surface of the wafer is covered with a grating of patterned electrodes 101. A pulsed voltage of opposite polarity is applied to electrodes 101 to produce electrical fields with a direction opposite to that of the spontaneous polarization present in crystal 100 and with a magnitude exceeding the coercive field. Suitable field strengths range from 3 kV/mm to 10 kV/mm for SLN or SLT and from 20 kV/mm to 60 kV/mm for CLN or CLT. The poling pulse voltage value and duration (normally 0.1 to 100 milliseconds) are designed to allow domains to stabilize. Initially crystal 100 has a polarization direction indicated by arrow 102 and this stage is referred to as forward poling. New domain nucleation in the form of tips 103, typically starts at the edges of electrodes where the local fields have a maximum value. By further increasing of the electrical field, tips have a tendency to be grouped in clusters through propagation parallel to the polar axis to the opposite face of the wafer. After the forward growth of the inverted regions from the nuclei toward the opposite face they broaden to the electrode line width. This growth process is strongly affected by the composition of the Z surface and it will also influence forward and side growth. As the tip propagates, its base diameter increases. I have found that the ratio of tip velocity along the Z-axis to the wall velocity in the XY plane is between 100:1 and 1000:1. This strong anisotropy is critical to creating a high-quality PPD structure in LN and LT. However, during tip propagation, tips from adjacent electrodes can merge before reaching the opposite surface, leading to the formation of a one joint domain instead of two, which reduces the conversion efficiency of PPLN or PPLT devices. When the tips of isolated domains contact the opposite face (tip termination stage), the walls of the domain straighten thereby creating a nucleus with the same diameter as that of the original. During this brief stage (normally shorter than 1 µs), the domain dramatically reduces its electrostatic interaction with neighboring domains as a result of its side walls becoming parallel to the Z axis. This process gives rise to merging under the electrode, and the tip termination stage leads to complete domain reversal under the electrode.

Newly formed domains exhibit a time-dependent coercive field. Reducing the externally applied field to 0 kV/cm in less than about 60 ms can cause the domains to flip back (a process called backswitching i.e., reversal of polarization direction). Therefore, to suppress backswitching the poling pulse should not be permitted to drop from the maximum poling voltage to zero in less than about 60 milliseconds. All six stages of domain kinetics (as shown in FIG. 1): domain nucleation, tip propagation, termination of the tip at the opposite side of the wafer, rapid coalescence under the electrode, propagation of domain walls out from the electrodes and stabilization of the new domains can be optimized to produce a specified domain period and duty cycle as close to 50% as possible with acceptable uniformity throughout the wafer. The local electrical field $E_I$ (r,t) averaged over the volume of the nucleus is the controlling parameter of these processes (see V. Shur et al Ferroelectrics Vol. 221, pp157-167, 1999; and Vol. 236, pp129-144, 2001). The local field $E_I$ (r,t) is determined by the sum of the external electrical field $E_{ex}$ (r, t), the depolarization field $E_{dep}$ (r, t)=$P_s/\epsilon_o\epsilon$, where $P_s$ is the spontaneous polarization, $\epsilon$ is the dielectric constant of LN or LT, produced by bound charges, and the screening fields due to the charge redistribution at the electrodes (the external screening field $E_{escr}$ (r, t)) and in the bulk( the bulk screening field $E_{bscr}$ (r, t)) crystal.

Establishing the effect of the screening process, the depolarization and local (internal) field on domain kinetics is of great significance for progress in PPD structure engineering. The depolarization field slows the domain growth while the screening process reduces its influence.

To accomplish the objects and advantages of the present invention a novel process for the fabrication of a PPD structure from congruent LN and LT ferroelectric crystalline wafers which have been coated with stoichiometric LN or LTN thin-films having an electrode and in some embodiments an insulator structure is described. The method allows an increase in the growth rate of nucleation for reverse domains during a forward poling stage, and a decrease in the coercive field by optimizing the polarization screening and back-switching processes. The ability to control and optimize these parameters during the poling process allows one to produce a PPD structure in CLN and CLT ferroelectric crystals with small feature sizes and a high uniformity through a large area of the wafer.

BRIEF DESCRIPTION OF THE FIGURES

FIGS. 1(a)-1(f) is a side view illustrating the stages of the domain kinetics during periodic poling of a ferreolectric crystal;

Figure 2A:
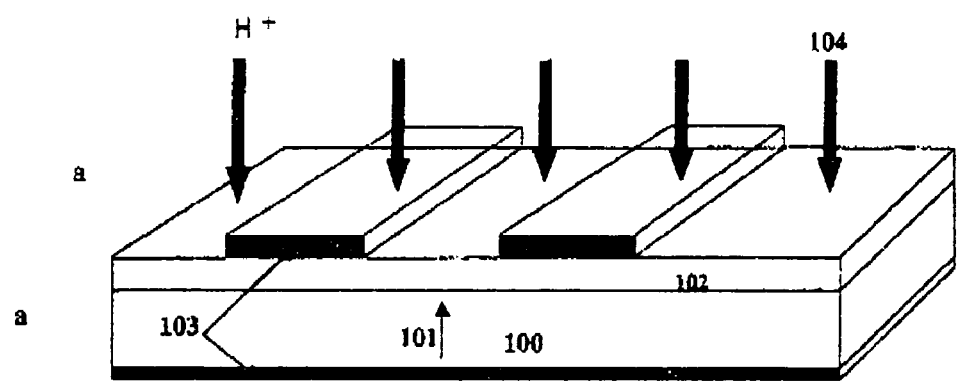
FIGS. 2(a)-2(b) are a plan view of an electrode structure for periodic poling, having deposited a SLN thin film 102 on CLN substrate 101, and schematic cross-sectional views illustrating the process of producing proton-exchange portions (105) from the SLN crystalline film that prevents the nucleation and growth of inverted domains outside of the electrodes.

The present invention thus provides a new and superior method for producing bulk PPLN and PPLT non-linear optical components with a 180 degree PPD structure in congruent LN and LT crystals by using, respectively, stoichiometric LN or LT thin-film coated onto CLN or CLT wafers, respectively. The main problem encountered in creating short, uniform and bulk (>300 μm thick) PPD structures from commercially available wafers are high coercive and internal fields and low nucleation rates at the surface. Stoichiometric LN and LT crystals are not easy to produce because the ideal crystal must have a precise chemical composition and near-perfect uniformity, and the crystal growth process is complicated Congruent crystals have an index of refraction that is substantially the same throughout the crystal (the uniformity is ~$10^{-5}$ for a 3" wafer) although the chemical composition may not be entirely uniform. This is a crucial consideration for periodically poling the material and maintaining phase matching throughout the crystal. So uniformity of available crystals is important, but comes at the price of a defective structure and therefore at the price of high coercive and internal fields.

I have developed a process for producing the desired domain structures with good reproducibility of the main parameters using congruent LN and LT wafers. These structures enable efficient doubling of the frequency of NIR radiation to thereby generate green-blue and near UV light (PPD structure periods are 2-8 μm) with 0.5 (50%) duty cycles.

Existing fabrication techniques have not been entirely successful,. For example, selective proton-exchange can be used to change crystal structure in selected areas. However, proton exchange is a very expensive process, it is carried out at a relatively high temperature and needs an additional masking process.

In the present invention to modify the surface of CLN and CLT wafers, deposition of stoichiometric LN and LT (SLN, SLT) thin films on the CLN or CLT wafers is carried out. SLN and SLNT have minimal defects, high inverted domain nucleation density and low coercive and internal fields. Unlike bulk crystals, perfect crystalline SLN and SLT thin-films can be grown at low temperature (300°-500° C., preferably ~450° C.), which prevents out diffusion of Li from the films during the domain growth process. I have developed a sol-gel based method for the deposition of stoichiometric LN and LNT thin films on CLN and CLT substrates.

SLN and SLT thin films can also be prepared by several other known techniques, including the liquid-phase epitaxial (LPE) growth sputtering, chemical vapor deposition (CVD), and metalorganic chemical vapor deposition (MOCVD) although these methods are not as advantageous. In all of the above mentioned alternative methods the main problem is related to composition control, which in the case of LN and LT is especially important since the properties of the films are sensitive to small changes of the material composition.

The Sol-Gel technique has advantages over those alternative methods of preparation of $LiNbO_3$ films for its ease and precision of composition control.

Advantages of my sol-gel technology include homogeneity of the initial gel, relatively low temperature of formation of the crystalline SLN or SLT structure, ease of preparation of large area thin films, ease of epitaxial growth of films as well as the low cost of the method.

In sol-gel technology a solution of metal-organic precursor, is applied by spin-coating at, for example, a 5000 rpm speed for 40 sec. At significantly lower speeds irregular application of the solution onto the substrate surface can sometimes take place. Drying of the gel precursor film can be carried out at, for example,150° to 250° C. for 5 min in air. Cycles of applying-drying can be repeated several times if desired for reaching the desired film thickness. Crystallization of the dried film can be carried out at 400 to 500° C. for 1 h in an oxygen rich atmosphere. By the above described method superior crystalline quality, stoichiometric films of SLN and SLT on congruent LN and LT wafers can be obtained. In sol-gel technology a solution of the initial metal-organic precursor such as, for example,Lithium ethoxide or iso-propoxide (LiOR, where $R=C_2H_5$ or $R=C_3H_7$) can be used as the lithium containing precursor and niobium alkoxides $(Nb(OR)_5)$ or tantalum alkoxides $(Ta(OR)_5$ can be used as the Niobium or Tantalum precursor, respectively. By mixing up equimolar amounts of niobium alkoxide solution and the lithium alkoxide a solution of the complexed alkoxide $LiNb(OR)6$, $R=C_2H_5$ or $C_3H_7$ can be obtained. This solution is used as gel for LN thin film deposition. The solution is stable but at the same time it shows high reactivity, does not require gel preparation by adding water into a precursor solution, and is extremely efficient for the preparation of stoichiometric LN or LT thin films. Drying of the gel film (precursor film) is carried out, for example at 200° C. for 5 min in air. Cycles of applying-drying can be repeated 2-3 times to reach the desired thickness. Crystallization of the film was carried out at 450° C. for 1 h in oxygen flow. By the above described method high quality, crystalline stoichiometric films of LN and LNT on congruent LN and LT wafers have been obtained

DETAILED DESCRIPTION OF THE INVENTION

Figure 2B:
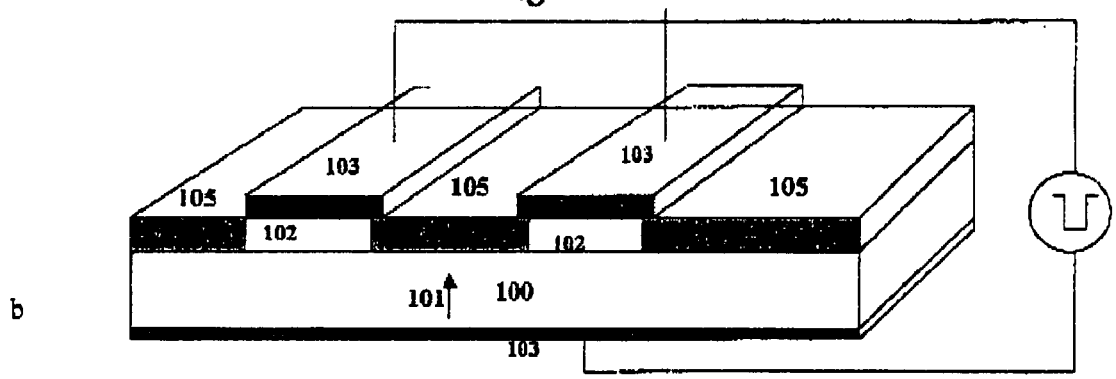

The process and product of the present invention are explained in greater detail below with reference to FIGS. 2-5. Referring first to FIGS. 2a and 2b, a single-domain congruent LN or LT wafer (substrate) 100 has a natural polarization direction as shown by the arrow 101. To obtain a sharp and defect-free interface between the deposited SLN or SLT film and the congruent LN or LT wafer substrate, a pre-deposition cleaning process of the wafer is preferably carried out, for example, by oxygen plasma washing. Next, a, for example, 0.2 μm thick SLN or SLT film (102) is deposited, preferably by the sol-gel process.

I have found that the after the crystallization of the film at, for example, 450° C., a single crystal stoichiometric film is formed in a single-domain state with its polarization in the same direction as that of the substrate.

Ta films, 0.1 μm thick (103), deposited, for example by plasma vapor sputtering (PVD) can be used as electrodes. The Ta film on the $Z^+$ surface can be processed by known photo-lithography and dry etch processes as shown in FIG. 2a The photolithography and etch processes will provide a periodic strip-shaped structure for the creation of a PPD structure on both the SLN or SLT thin-films (102) and the CLN or CLT substrate (100) by applying a poling field to the electrodes 103. To prevent the nucleation and growth of inverted domains outside of the electrodes, $H^+$ (proton) implantation (104) can suitably be used (FIG. 2a). The patterned Ta film serves both as an electrode and as a hard mask with respect to protons. As a result, proton implantation will affect the crystal structure only in the areas not covered by the etched electrode (areas 105) in FIG. 2b and prevent side growth of inverted domains into the proton implanted region 105 so that this region is not affected by the poling process. Known affordable, low energy ion implantation processes at room temperature can be used in the present invention because the protons have to penetrate only into a 0.1 μm thick layer of SLN or SLT.

Figure 3A:
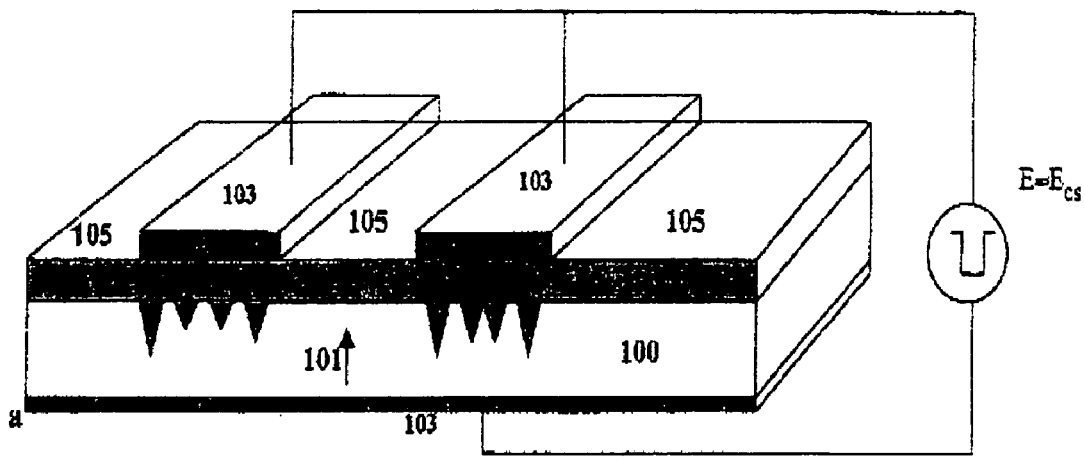
FIGS. 3(a)-3(b) illustrates the periodic poling process of the structure illustrated in FIG. 2. Nucleation and rapid coalescing of domains takes place under electrodes 103 in SLN film 102 due to the higher nucleation site density of stoichiometric LN. Then by further increasing of an electrical field from $E=Ecs\approx 4$ kV/mm to $E<Ecb\approx 20$ kV/mm (Ecs being the coercive field in the stoichiometric film and Ecb the coercive field in the wafer), periodic inverted domains 106 propagate thought wafer 100 to bottom electrode 103.
Figure 3B:
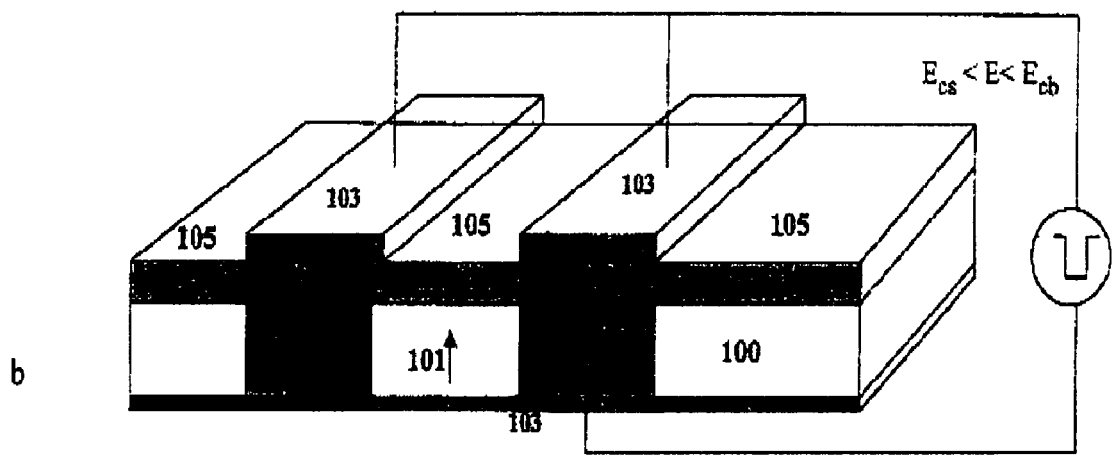

Applying an electrical field to electrodes 103, again in the spontaneous polarization direction (negative pulsed voltage is applied on the $Z^-$ face (the periodic electrodes on the $Z^+$ face being grounded as shown) nucleation of reversed polarization domains will start at the surface of the stoichiometric film under the patterned electrodes as shown in FIG. 3a. High voltage pulses are necessary for producing electrical fields greater than the coercive field (Ecs) of SLN or SLT crystalline films which is ≦4 kV/mm. This is one order less than the Ecb of CLN or CLT. Due to the high nucleation density of reversal domains in the SLN or SLT surface layer forward growth in the polar direction and enlargement of the nucleated domains and their coalescence under the electrodes will take place at comparatively low field strengths such as ≈4 kV/mm. By slightly increasing the poling field, the spike-like domains will penetrate into the CLN or CLT substrate through both forward and sideways domain wall motion creating the nucleation of the reversal domains in the bulk CLN or CLT crystal (shown in FIG. 3a).

Proton implanted areas 105 will prevent nucleation and growth of inverted domains outside of the electrodes 103. This method allows reproducible fabrication of 0.5-1 mm thick CLN and CLT wafers having short period PPD structures with a 0.5 duty cycle using low electrical poling fields.

Figure 4A:
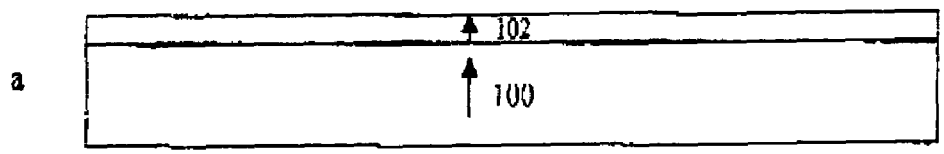
FIGS. 4(a)-4(c) is a side view showing the process of fabrication of a nonlinear-optical device having a PPD structure formed by a photolithography and reactive-ion etch process of a SLN thin-film 102.
Figure 4B:
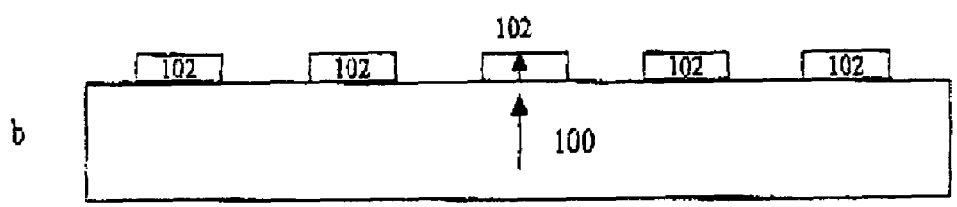
Figure 4C:
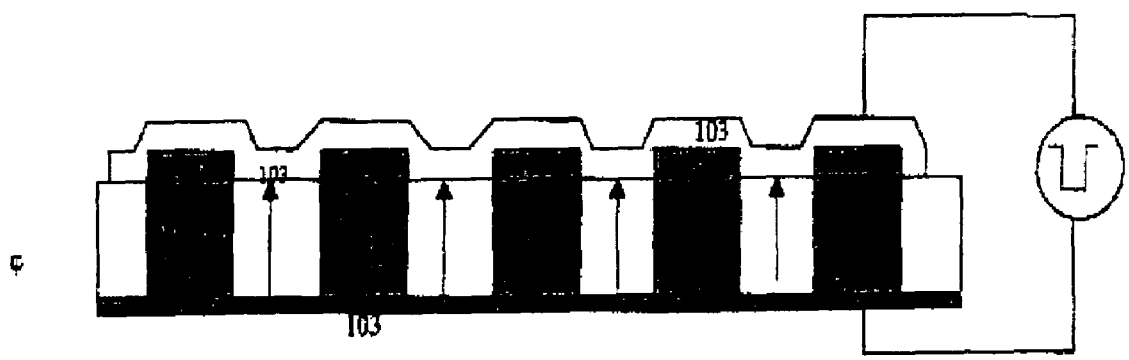
Figure 5A:
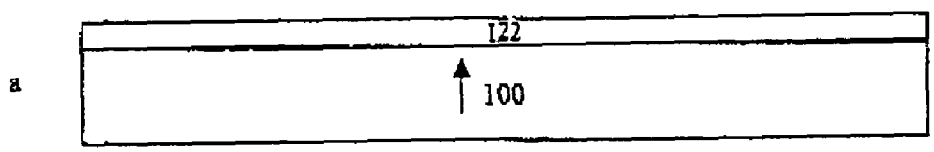
FIGS. 5(a)-5(c) is a side view which illustrates the process of fabrication of a nonlinear-optical device having a PPD structure formed by deposition and patterning of 122, a $SiO_2$ thin film and forming of the single-domain, crystalline SLN film 102 in the strip-shaped groves 123.
Figure 5B:
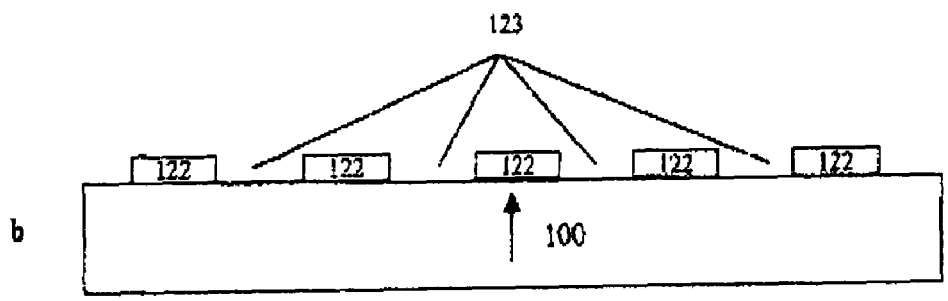
Figure 5C:
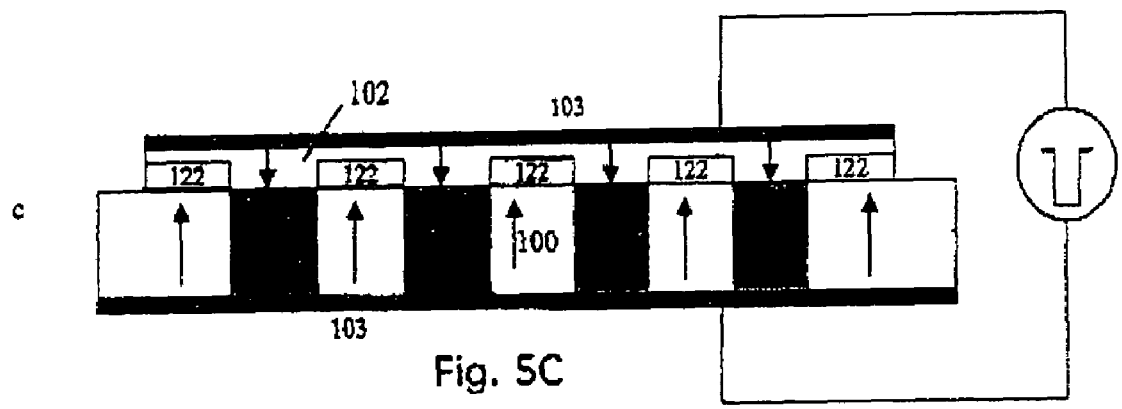

The present invention also comprises a PPD structure based nonlinear optical device having a single-domain CLN or CLT crystalline substrate 100 (FIG. 4). A SLN or SLT single crystalline film 102 is deposited on a substrate preferably by my sol-gel epitaxial growing process and by further forming a periodic structure in the film by the previously described photolithography and reactive-ion etch processes on the SLN or SLT layer (FIG. 4b). By applying poling fields to electrodes 103 (FIG. 4c), a PPD structure can be created. Due to the high coercive field of the CLN or CLT substrate, the side growth of inverted domains outside of the SLN or SLT fingers is avoided. The process allows one to avoid the need for proton implantation and metal etching processes.

The present invention also comprises a PPD structure based nonlinear optical device having a single-domain CLN or CLT crystalline substrate 100 (FIG. 5) whereby: i) an amorphous $SiO_2$ 0.2-0.5 μm thick film 122 is deposited on the substrate by a plasma enhanced chemical vapor deposition (PECVD) or spin-on-glass process; ii) strip-shaped groves 123 are formed in the silica film by a photolithography and etch process, iii) the single crystalline SLN or SLT film 102 is formed in the groves by a sol-gel deposition process, and iv) the metallic electrodes 103 are then formed on the top and bottom faces of the structure. By applying a voltage pulse the crystalline film in the groves and those portions of the wafer under the groves are polarized in the reverse direction to that of the initial state of polarization. The electrically-insulating $SiO_2$ dielectric film may be up to several microns in thickness. (Other high dielectric strength materials such as $TiO_2$ or $Al_2O_3$ may alternatively be used). Although electric insulation is desirable, it is not required provided that the material withstands the high applied voltage without breakdown or deterioration. The pattern of the electrically-insulating, electric field-strength controlling mask is obtained by exposing the photo-resist through a suitable photo-mask using standard contact or projection lithographic techniques.

The patterned $SiO_2$ film plays two roles: i) increased isolation between groves and ii) decreased electrical field outside of groves because of the low dielectric constant of silica. Both factors help to prevent nucleation and growth of inverted domains outside of the grooves. By increasing the temperature of the structure when applying the poling voltage, e.g., up to about 150° C., it is possible to optimize the PPD structure by changing the conductivity of the CLN or CLT. This method allows fabricating, using 0.5-1 mm thick CLN and CLT wafers, having a reproducible and short period PPD structure with a 0.5 duty cycle at low electrical poling fields. The design will also allow one to avoid the need for proton implantation and the metal etching step.

In this alternative embodiment of the invention, the electrically-insulating dielectric film is composed of $SiO_2$ or other hard insulating dielectric material such as $TiO_2$ or $Al_2O_3$, providing the twin advantages of greater electrical insulation and increased robustness when compared to simple photo-resist layers.). The hard insulating layer is patterned to produce the desired electric field control configuration using standard photolithographic techniques and an etching process, e.g. wet etching with a buffered oxide etch. (Alternative etching techniques which can be used include reactive ion beam etching or ion bombardment etching.) A hard oxide insulating layer such as $SiO_2$ is more suited to large volume production than the relatively soft photo-resist layer as the hard patterned film is less likely to be damaged during processing and handling.

Figure 6A:
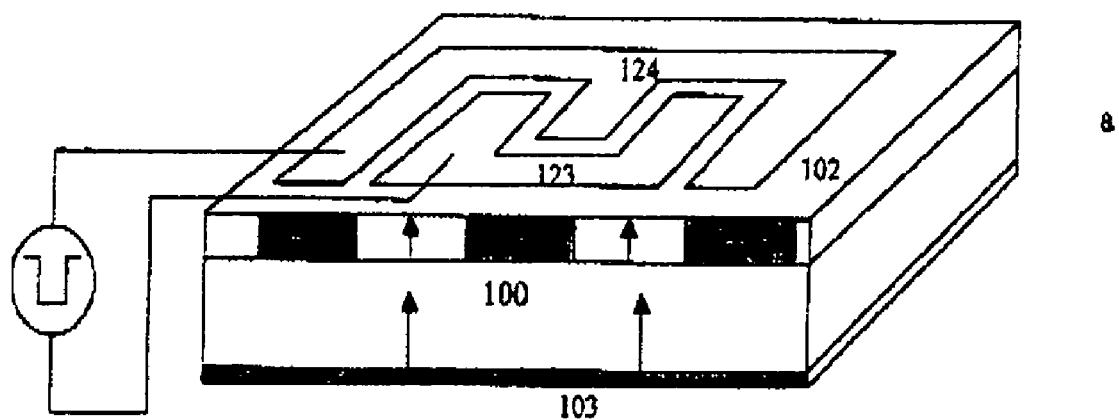
FIGS. 6(a)-6(b) are schematic views illustrating the fabrication process for a nonlinear-optical device having a PPD structure formed by the deposition of a SLN or SLT film on CLT or CLN wafers,respectively, and by periodically polling the stoichiometric film and substrate by using interdigital 123, 124 and bottom 103 electrodes.
Figure 6B:
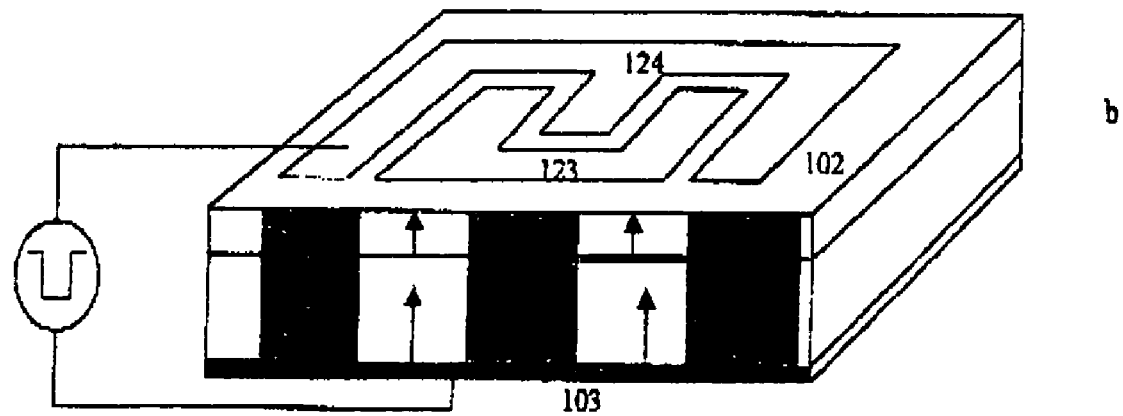

Electrical contact to a first surface, (e.g., the −z surface) of the substrate crystal, is made by a first electrically-conductive material which may in alternative embodiments be, for instance, a liquid conductor, a thin metal film deposited on the −z surface, or a bulk electrical conductor adjacent to the −z surface. Note that adjacent in the context of the embodiments herein includes the use of electrically insulating dielectric coatings between materials (the substrate surface and the conductor). Electrical contact to a second opposing surface of the crystal, (the +z surface), opposing the first surface, is achieved by the deposition of a second electrically-conductive material (which can be the same or a different material as the first electrically conductive material) upon the electrically-insulating dielectric film The second electrically-conductive material in liquid form may be a saturated aqueous solution of a salt such as LiCl or KCl. The liquid conductor fills the contact-windows in the insulating dielectric film and contacts the crystal +z surface. Electrical contact to the liquid conductor is suitably made using electrically-conducting plates or wires, allowing good current flow. Liquid conductor contact has a particular advantage. It eliminates the sometimes poor current distribution ability of thin film metallic electrodes and wire bonded contacts, which can sometimes lead to localized heating and an increased likelihood of electrical breakdown, combined with poor edge quality of the inverted domains at the crystal +z surface The present invention also comprises a PPD structure based nonlinear optical device fabrication process comprising having a single-domain CLT or CLN crystalline substrate 100 (FIG. 6), a SLN or SLNT single crystalline film 102 is preferably deposited on this substrate by the previously described sol-gel epitaxial growth process and with the subsequent forming of 0.5 μm thick interdigital periodic electrodes (e.g., NiCr, ITO, Ti or T are all suitable electrode materials) 123, 124 on the surface of the film 102 by the previously described photolithography and reactive-ion etch processes. Uniform and short-period PPD structures can then be formed in the SLT or SLN films by poling with the interdigital electrodes 123, 123 on the surface as shown in FIG. 6*a*. SLT is the most preferred material for film 102, because it has a relatively low ferreoelectric phase transition temperature of about 620° C. Near to this temperature SLT has a low coercive field strength of ~10 V/mm and if this structure is heated up to ~550° C. and poling pulses of ≧10 V/mm applied between top 124 and bottom 103 electrodes (FIG. 6*b*), the PPD structure formed in the SLT film, will easily transform the entire structure to a bulk, poled LT wafer. The sample is then cooled to room temperature and a final stage poling is not necessary. This method allows fabricating in 0.5-1 mm thick CLT wafers, a reproducible and short period PPD structure (with a 2-3 μm period) with a 0.5 duty cycle using low electrical poling fields, for UV applications. The design allows one to avoid proton implantation and the need for the etching and insulator deposition and patterning processes.

In the preferred embodiment using congruent $LiNbO_3$ as the ferroelectric substrate crystal, the patterned electric field controlling mask is formed on the +z crystal surface, as this is where domain nucleation occurs, followed by growth towards the -z face. As domain inversion is nucleated on the +z surface there is no need to provide a patterned mask on the -z face, consequently a planar electrically-conducting material provides suitable electrical contact to the -z face. In all embodiments for $LiNbO_3$ and $LiTaO_3$ the patterned electric field controlling mask should be applied to the material surface at which domain nucleation is to commence. The potable material must be a dielectric for the electric field poling process to work because it must be capable of supporting an applied field without being destroyed. It need not be an insulating material as long as the induced currents cause no damage during the poling process A pulsed high-voltage electrical potential is applied across the crystal substrate using a suitable power supply, to oppose the spontaneous polarization direction of the substrate crystal, i.e., a positive voltage is applied to the +z face of the crystal, and the -z face is grounded. Alternatively, a negative voltage may be applied to the electrically conducting material placed adjacent to the -z face while the means for controlling the electric field strength placed adjacent to the +z face is grounded. It is not necessary for the electrically conductive materials used for the electrodes to have the conductivity of a metal; it is sufficient that a uniform potential can be applied via the electrically conductive material during the poling process. The uniform potential may include small potential variations across the potable dielectric material provided that the resultant field variations at the nucleating surface for the domain inversion are small compared to the variations imposed by the means for controlling the electric field strength, and provided that the resultant field variations at the opposite surface of the potable dielectric material do not cause the bulk field strength to fall below the threshold field for propagation of the poling. It should also be noted that any ground is a sufficient electrode, no matter how far away it may be placed from the sample. If a ground plane is used as one of the electrodes, it should be kept close only to reduce the potential required to produce the needed electric fields within the potable dielectric material.

Multiple high-voltage pulses may suitably be applied to the sample, each with a duration ranging from milliseconds to seconds. In all embodiments the applied effective potential must exceed the coercive field of the crystal in order to achieve poling. The domain-orienting potential threshold depends on the electrode configuration and the sample temperature. For one embodiment of the present invention, using a photo-resist insulating layer and a saturated LiCl electrode at room temperature, the domain-reversing potential threshold for a $LiNbO_3$ substrate crystal is around 23-24 kV/mm.

Poling at an elevated temperature (200-500° e.g., 230° C.) reduces the likelihood of breakdown occurring when combined with electrically-conducting epoxy contacts to the crystal. It is believed that the same reduction in breakdown likelihood will result from poling samples at elevated temperature. If poling is performed at elevated temperatures, the domain reversal potential threshold is decreased. Experimentally it has been observed to drop from about 11.8 kV at room temperature to about 8.9 kV at 230° C., with electrical contact to the crystal being made using electrically-conducting epoxy.

During poling, the voltage across the sample and the current flow are monitored. The charge transfer to the ferroelectric crystal is deliberately limited to the amount required to produce the desired domain inversion pattern. The charge flow may be limited by 1) restricting the current flow in the circuit (for instance with a resistor connected in series with the crystal), 2) restricting the applied voltage (the closer the applied voltage is to the poling threshold, the lower the current which flows), 3) restricting the pulse length of the applied voltage, or by 4) any combination of these variables. By limiting the charge flow to that required to create the desired pattern, coalescence of the patterned (periodic) domains by lateral domain wall growth is prevented. (This would otherwise increase the domain inverted surface area and therefore require a larger charge transfer).

The invention claimed is:

1. A method for fabricating a periodically poled ferroelectric nonlinear optical component, the method comprising:
   i) providing a substrate, selected from the group consisting of congruent $LiNbO_3$, conqruent $LiTaO_3$, MgO doped congruent $LiNbO_3$ and, MgO doped congruent $LiTaO_3$, said substrate having a first surface, a second surface opposed to the first surface, and a selected polarization direction that is approximately perpendicular to the first surface and also to the second surface;

ii) providing the first surface of the substrate with a coating that comprises crystalline stoichiometric $LiNbO_3$ when said substrate is congruent $LiNbO_3$ or MgO doped $LiNbO_3$ and crystalline stoichiometric $LiTaO_3$ when said substrate is congruent $LiTaO_3$ or MgO doped $LiTaO_3$;

iii) providing, on said coating, a first metallic film having a selected periodic domain pattern;

iv) providing, on the second surface of the substrate, a second metallic film; and v) applying a pulsed electrical voltage between the first and second metallic films for a time sufficient to create a periodically poled domain structure in the substrate and coating.

2. A method in accordance with claim 1 wherein said substrate has a thickness ranging from about 0.5 mm to about 2 mm.

3. A method in accordance with claim 1 wherein said first coating has a thickness in the range of 0.1-0.5 µm.

4. A method in accordance with claim 1 wherein said first and said second metallic films each independently have a thickness in the range of 0.05-0.5 µm and said first metallic film has a selected periodic pattern with a period in a range 2-8 µm.

5. The method of claim 1 further comprising the step of implanting protons into that portion of said first coating not covered by said first patterned metallic film prior to applying said pulsed electric voltage.

6. The method of claim 1, further comprising choosing said selected periodic domain pattern for said first metallic film to have a period in a range 2.5-4 µm.

7. The method of claim 1, further comprising choosing said selected periodic domain pattern for said first metallic film to have a period in a range 5-8 µm.

8. The method of claim 1, wherein said first and said second metallic films comprise at least one of the materials Ta and Al.

9. The method of claim 1 wherein said pattern is created by photolithography and reactive ion etching.

10. The method of claim 1 wherein said pulsed voltage is sufficient to create a field strength of at least 4 KV/mm.

11. A method according to claim 10 wherein said pulsed voltage has a 0.1 to 100 millisecond duration.

12. A method according to claim 1 wherein said substrate is maintained at a temperature between about 200° C. and 500° C. while said pulsed voltage is being applied.

13. The method of claim 1 wherein said substrate is congruent Lithium Niobate and said first coating is stoichiometric Lithium Niobate.

14. The method of claim 1 wherein said substrate is congruent Lithium Tantalate and said first coating is stoichiometric Lithium Tantalate.

15. A method in accordance with claim 1 wherein said first coating is formed by the steps of: i) spin coating a gel film comprising $LiNb(OR)_6$ when said substrate is Lithium Niobate and $LiTa(OR)_6$ when said substrate is Lithium Tantalate wherein R is ethyl or isopropyl; ii) drying said film at a temperature between 150° C. and 250° C.; and iii) crystallizing said dried film in an oxygen rich atmosphere at a temperature between 400° C. and 500° C.

16. The method of claim 15 wherein said spin coating and drying is carried out a plurality of times.

17. A method for the fabrication of a periodically poled ferroelectric nonlinear optical component, the method comprising:

i) providing a substrate, selected from the group consisting of congruent $LiNbO_3$, conqruent $LiTaO_3$, MgO doped congruent $LiNbO_3$ and, MgO doped congruent $LiTaO_3$, said substrate having a first surface, a second surface opposed to the first surface, and a selected polarization direction that is approximately perpendicular to the first surface and also to the second surface;

ii) providing a first surface of the substrate with a coating that comprises crystalline stoichiometric $LiNbO_3$ when said substrate is congruent $LiNbO_3$ or MgO doped $LiNbO_3$ and crystalline stoichiometric $LiTaO_3$ when said substrate is congruent $LiTaO_3$ or MgO doped $LiTaO_3$;

iii) providing on said coating by photolithography and reactive ion etching a selected periodic domain pattern;

iv) providing a first electrode on the outer surface of said patterned coating;

v) providing, on an opposing second surface of the substrate, a second electrode; and vi) applying a pulsed electrical voltage between the first and second electrodes for a time sufficient to create a periodically poled domain structure in the substrate and coating.

18. A method for the fabrication of a periodically poled ferroelectric nonlinear optical component, the method comprising:

i) providing a substrate, selected from the group consisting of congruent $LiNbO_3$, congruent $LiTaO_3$, MgO doped congruent $LiNbO_3$ and, MgO doped congruent $LiTaO_3$, said substrate having a first surface, a second surface opposed to the first surface, and a selected polarization direction that is approximately perpendicular to the first surface and also to the second surface;

ii) providing the first surface of the substrate with a dielectric coating comprising $SiO_2$, $TiO_2$ or $Al_3$;

iii) forming grooves having a selected periodic domain pattern in said dielectric coating;

iv) depositing in said grooves a layer of crystalline stoichiometric $LiNbO_3$ when said substrate is congruent $LiNbO_3$ or MgO doped $LiNbO_3$ and crystalline stoichiometric $LiTaO_3$ when said substrate is congruent $LiTaO_3$ or MgO doped $LiTaO_3$;

v) providing, on the outer surface of said crystalline layer, a first metallic film;

vi) providing, on the second surface of the substrate, a second metallic film; and vii) applying a pulsed electrical voltage between the first and second metallic films for a time sufficient to create a periodically poled domain structure in the substrate and crystalline layer.

19. A method for the fabrication of a periodically poled ferroelectric nonlinear optical component, the method comprising:

i) providing a substrate, selected from the group consisting of congruent $LiNbO_3$, conqruent $LiTaO_3$, MgO doped congruent $LiNbO_3$ and, MgO doped congruent $LiTaO_3$, said substrate having a first surface, a second surface opposed to the first surface, and a selected polarization direction that is approximately perpendicular to the first surface and also to the second surface;

ii) providing the first surface of the substrate with a coating that comprises crystalline stoichiometric $LiNbO_3$ when said substrate is congruent $LiNbO_3$ or MgO doped $LiNbO_3$ and crystalline stoichiometric $LiTaO_3$ when said substrate is congruent $LiTaO_3$ or MgO doped $LiTaO_3$;

iii) providing, on said coating, an electrode comprising a metallic film having a selected interdigital periodic domain pattern;

iv) providing, on the second surface of the substrate, a second electrode; and v) applying a pulsed electrical voltage between the first and second electrodes for a time sufficient to create a periodically poled domain structure in the substrate and coating.

20. The method of claim 19 wherein said second electrode comprises a saturated aqueous salt solution.

* * * * *